United States Patent
Tsuboi et al.

(10) Patent No.: US 7,681,889 B2
(45) Date of Patent: Mar. 23, 2010

(54) SEAL DEVICE

(75) Inventors: Hajime Tsuboi, Tokyo (JP); Yuji Igawa, Ibaraki (JP)

(73) Assignees: Eagle Industry Co., Ltd., Tokyo (JP); Hitachi Construction Machinery Co., Ltd., Tokyo (JP)

( * ) Notice: Subject to any disclaimer, the term of this patent is extended or adjusted under 35 U.S.C. 154(b) by 431 days.

(21) Appl. No.: 11/658,018

(22) PCT Filed: Jul. 20, 2005

(86) PCT No.: PCT/JP2005/013330

§ 371 (c)(1),
(2), (4) Date: Jan. 22, 2007

(87) PCT Pub. No.: WO2006/009181

PCT Pub. Date: Jan. 26, 2006

(65) Prior Publication Data

US 2007/0241512 A1 Oct. 18, 2007

(30) Foreign Application Priority Data

Jul. 21, 2004 (JP) ............................. 2004-213216

(51) Int. Cl.
*F16J 15/34* (2006.01)
(52) U.S. Cl. ...................................... 277/377; 277/382
(58) Field of Classification Search ................. 277/377, 277/380–385
See application file for complete search history.

(56) References Cited

U.S. PATENT DOCUMENTS

| | | |
|---|---|---|
| 3,452,995 A | 7/1969 | Engelking |
| 3,524,654 A | 8/1970 | Hasselbacher et al. |
| 4,077,634 A * | 3/1978 | Durham ....................... 277/382 |
| 4,087,100 A * | 5/1978 | Yoshihashi et al. .......... 277/399 |

(Continued)

FOREIGN PATENT DOCUMENTS

DE 9303229.3 3/1993

(Continued)

*Primary Examiner*—Vishal Patel
(74) *Attorney, Agent, or Firm*—Arent Fox LLP

(57) ABSTRACT

A seal device where, even if a fluid to be sealed is under high pressure, a seal surface of a seal ring is prevented from producing heat and the seal surface is prevented from wearing. The seal device has a first seal ring (5) having a first seal surface (5A) at an end surface and having, on the opposite side of the first seal surface (5A), a first pressing surface (5B) formed on an inclined surface: a first seal retainer (51) having a first inner periphery fixation surface (51A) facing the first pressing surface (5B); a first elastic seal ring (2) for pressing the first pressing surface (5B) in an axial direction by elastic force produced by sealed compression between the first pressing surface (5B) and the first inner periphery fixation surface (51A); a second seal ring (15) in tight contact with the first seal surface (5A) of the first seal ring (5) and having a second seal surface (15A) slidable relative to the first seal surface (5A); and a second seal retainer (61) in which the second seal ring (15) is sealedly held. The first pressing surface (5B) is formed as an inclined surface where the ratio H/L is in the range not exceeding 0.5, with H being the width in a radial direction, L the length in the axial direction of the first pressing surface (5B).

4 Claims, 14 Drawing Sheets

U.S. PATENT DOCUMENTS

| | | | |
|---|---|---|---|
| 4,753,303 A | * | 6/1988 | Burr .......................... 175/367 |
| 4,844,483 A | | 7/1989 | Iijima et al. |
| 5,524,718 A | * | 6/1996 | Kirk et al. .................. 175/371 |

FOREIGN PATENT DOCUMENTS

| | | |
|---|---|---|
| EP | 1 524 461 A1 | 4/2005 |
| JP | 56-164280 A | 12/1981 |
| JP | 58-186254 U | 12/1983 |
| JP | 63-60765 U | 4/1988 |
| JP | 63-135659 A | 6/1988 |
| JP | 2002-022019 A | 1/2002 |
| JP | 2002-285141 A | 10/2002 |
| WO | WO 93/20326 A1 | 10/1993 |
| WO | WO 99/20924 A1 | 4/1999 |
| WO | WO 2004/022643 A1 | 3/2004 |

* cited by examiner

[TEMPERATURE MEASUREMENT CHART]

[SLIDING SURFACE IN CROSS SECTION FORM]

[TEMPERATURE MEASUREMENT CHART]

[SLIDING SURFACE IN CROSS SECTION FORM]

[TEMPERATURE MEASUREMENT CHART]

[SLIDING SURFACE IN CROSS SECTION FORM]

SEAL DEVICE

CROSS-REFERENCE TO RELATED APPLICATION

This application is a National Stage entry of International Application No. PCT/JP2005/013330, filed Jul. 20, 2005. The disclosure of the prior application is hereby incorporated herein in its entirety by reference.

TECHNICAL FIELD

The present invention relates to a seal device disposed between a pair of relatively rotating members typically seen in the rollers of a crawler, track roller, reduction gear, hydraulic motor or the like. More particularly, the invention relates to a seal device in the reduction gear unit of automobiles or hydraulic motors of a variety of machinery, which provides an effective seal at the interface of relatively moving members against a sealed fluid with an increased pressure due to contaminants contained therein or a highly pressurized sealed fluid.

BACKGROUND ART

Primary related art of the present invention is found as a seal device shown in FIG. 13 (for example, see Japanese Utilities Laid-open Publication No.H1-98368 or U.S. Pat. No. 4,844,483). This seal device 100 is applicable to a drive wheel apparatus of a mining damp truck.

The seal device 100 is arranged as shown in FIG. 13. The seal device 100 of FIG. 13 displays a cross sectional view of a half portion thereof being mounted to a drive wheel apparatus. In FIG. 13, a shaft (not shown) is disposed within a through hole of a fixed side retainer 130. There is disposed the seal device 100 in a cavity 120 which is formed between the shaft and the fixed side retainer 130. This deal device 100 protects the cavity 120 defined by the shaft and the fixed side retainer 130 against the attack by a sealed fluid M from outside A such as water, sludge or the like containing small particles like sands or the like.

In the seal device 100, a first seal ring 105 having a seal surface 105S and a second seal ring 115 having an opposed seal surface 115S not only face to each other surrounding the shaft, but the seal surface 105S and the opposed seal surface 115S are pressed against each other. In order to assure a sealing contact between the seal surface 105S on the first seal ring 105 and the opposed seal surface 115S on the second seal ring 115, the periphery of the first seal ring 105 is formed by a first tapered surface 105A, a first arcuate surface 105B and a first vertical surface 105C. Likewise, the periphery of the second seal ring 115 is formed by a second tapered surface 115A, a second arcuate surface 115B and a second vertical surface 115C.

Next, a first support surface 130A on the fixed side retainer 130 forms a shoulder surface, which defines one side wall of the cavity 120. Likewise, a second support surface 140A on a rotary side retainer 140 also forms another shoulder surface. Then the first seal ring 105, the second seal ring 115, the fixed side retainer 130 and the rotary side retainer 140 defines the cavity 120 therewithin.

There is disposed a first O-ring 102 near the cavity 120 side between the first tapered surface 105A and the first support surface 130A. Likewise, there is disposed a second O-ring 103 between the second tapered surface 115A and the second support surface 140A. The first O-ring 102 undergoes elastic deformation to form an elliptic cross section, which brings a first contact surface 102B into contact with the first tapered surface 105A while a second contact surface 102C is pressed against the first support surface 130A. Moreover, the second O-ring 103 also undergoes elastic deformation to form an elliptic shape after the first contact surface 103B comes into contact with the second tapered surface 115A and the second contact surface 103C is pressed against the second support surface 140A.

In the seal device 100 configured as described above, the first seal ring 105 is urged in the axial direction by the elastic deformation force of the first O-ring 102 while the second seal ring 115 also is urged in the axial direction opposing to the first seal ring 105 by a similar urging force due to the second O-ring 103. And the seal surface 105A and the opposed seal surface 115A slide to each other while maintaining tight contact thereof. When a sealed fluid M containing impurity reaches the cavity 120 from outside A, the pressure of the sealed fluid M creates urging forces onto the first O-ring 102 and the second O-ring 103 as well as onto the first seal ring 105 and the second seal ring 115 as illustrated in FIG. 3. The pressure of the sealed fluid M then act on the first vertical surface 105C and the second vertical surface 115C so that the pair of the seal surface 105A and the opposed seal surface 115A are pressed against each other by a large pressure which exceeds a prescribed value. Therefore, the seal surface 105A and the opposed seal surface 115A are forced to slide to each other under an intense press contact, which leads to a high temperature due to slide friction.

According to the experiments, when dirt water enters the cavity 120 impurities such as dirt and sand particles contained in the fluid are accumulated in the cavity 120. This cumulative pressure causes an urging pressure to the first vertical surface 105C on the first seal ring 105 and the second vertical surface 115C on the second seal ring 115 in mutually opposing directions, and friction heat generated by the sliding between the seal surface 105A and the opposing seal surface 115A sometimes increases the temperature of the respective seal rings 105, 115 to more than 300 degrees Celsius. When the first seal ring 105 and the second seal ring 115 are heated too much due to the heat generated during the sliding motion, rubber-made first O-ring 102 and second O-ring 103 get softened by the high temperature and fail to restore elastically to their original states. Therefore the first O-ring 102 and the second O-ring 103 are likely to diminish their ability of providing resiliently urging forces against the first seal ring 105 and the second seal ring 115, respectively. Further, the high temperature deteriorates the seal surface 105A and the opposing seal surface 115A and accelerates wear thereof.

Moreover, a floating seal device 150 shown in FIG. 14 is a second prior art related to the current invention (for example, see Utilities Public S62-4665 (pages 1 through 5, FIG. 5) or Patent Public 2002-98326, or the like).

This floating seal device 150 is so arranged that a first seal ring 152 and a second seal ring 153 which surround a drive shaft (not shown) substantially extend to the radial direction and face to each other on the slant. A seal surface 152A of the first seal ring 152 and a seal surface 153A of the second seal ring 153 are kept in sealing contact. The seal contact between the seal surface 152A of the first seal ring 152 and the seal surface 153A of the second seal ring 153 is urged by the compression force which is caused by the elastic deformation of a rubber-made first O-ring 155 and a second O-ring 156 to an elliptic cross section form. For that purpose, the first O-ring 155 and the second O-ring 156 are disposed, respectively, between a first casing 160 and the first seal ring 152 and between a second casing 170 and the second seal ring 153 in such a way that the O-rings face to each other while forming an angle to the radial direction. A first seal tight surface 155A is pressed against a first support surface 160A while a second seal tight surface 156A is pressed against a second support surface 170A. Further, a first seal tight surface 155B is pressed against the first seal ring 152 while a second seal tight surface 156B is pressed against the second seal ring 153.

This floating seal device 150 provides a seal against a high pressure sealed fluid M containing slurry. It also effects a seal against a fluid M containing fine particles. High pressure of the sealed fluid M which breaks in from outside A causes a squeeze on the rubber material of the first O-ring 155 and the second O-ring 156 which are arranged in a symmetric location, and that intensifies the press contact between the seal surfaces 152A and 153A of the first seal ring 152 and the second seal ring 153, respectively. Significant resilient compression forces caused by the first O-ring 155 and the second O-ring 156 also intensify a press contact between the respective seal surfaces 152A and 153A, and thereby wear of the seal surfaces 152A and 153A is accelerated.

When the sealed fluid M comes into the cavity 160 from outside A and exerts pressure onto the second O-ring 156 and the second seal ring 153 as well as the first O-ring 155 and the first seal ring 152, slurry trapped between the first O-ring 155 and the first seal ring 152 and between the second O-ring 156 and the second seal ring 153, respectively, give pressure to the first O-ring 155 and the second O-ring 156 in radially inward a direction, and the respective seal surfaces 152A, 153A are deviated from a parallel relationship relative to each other since the first O-ring 155 and the second O-ring 156 are made of rubber material. Such a departure from the parallel relationship of the respective seal surfaces 152A, 153A causes uneven wear of the seal surfaces 152A, 153A. Also the respective pressure receiving areas disposed on radially outward side of the tapered surfaces 152B on the first seal ring 152 and the tapered surface 153B on the second seal ring 153 are increased by the deviations of the first O-ring 155 and the second O-ring 156, and the pressure by the slurry therefore urges the pressure receiving surfaces of the respective tapered surfaces 152B, 153B and causes wear of the respective seal surfaces 152A, 153A which slide against each other under the press contact. Moreover, the sliding frictional heat of the first seal ring 152 and the second seal ring 153 causes softening and stress relaxation of the first O-ring 155 and the second O-ring 156, and decreases resilient urging forces of the first O-ring 155 and the second O-ring 156.

The present invention is introduced to alleviate the above mentioned problems. A primary technical goal which this invention tries to achieve is to prevent wear of respective seal surfaces under the influence of a sealed fluid at high pressure or containing impurities. Further, stress relaxation in the respective resilient seal rings due to heat emitted during sliding of the respective seal surfaces is prevented and the resilient seal rings can exhibit outstanding resilient performance for urging the seal rings.

DISCLOSURE OF THE INVENTION

A primary object of the present invention is to alleviate the above mentioned technical disadvantages, and a solution to such disadvantages is embodied as follows.

A seal device constructed in accordance with the principles of the present invention is a floating seal device to provide a seal between one member and the other member which make a rotary motion relative to each other. This seal device has a first seal ring which disposes a first seal surface on one end thereof and a first press urging surface on the back side of the first seal surface. The first press urging surface is formed as a tapered surface by which an urging pressure can exert an urging force in the axial direction. There also is disposed a first seal retainer which has a first inner circumferential fixing surface which is located at the other end of a cavity defined by the first inner circumferential fixing surface and the first press urging surface. Moreover, there is disposed a first resilient seal ring between the first press urging surface and the first inner circumferential fixing surface in a seal tight manner in which the first resilient seal ring exerts a resilient urging force in the axial direction against the first press urging surface. Yet further, there is disposed a second seal ring which has a second seal surface and a support surface in which the second seal surface is slidably in seal tight contact with the first seal surface of the first seal ring and the support surface provides a support to the second seal surface. There is also disposed a second seal retainer which has a fixing surface for retaining the support surface of the second seal ring. There is further disposed a seal annular body which effects a seal between the fixing surface of the second seal retainer and the support surface of the second seal ring. The first press urging surface is defined as a tapered surface in which the dimensional ratio of radial length thereof and axial length thereof is no more than H/L=0.5.

A seal device of this invention is formed in such a manner that, as to the first press urging surface of the first seal ring, a dimensional ratio of radial width H thereof over axial length L thereof is no more than 0.5. Therefore even when a sealed fluid with particles like dirt and sand breaks into the cavity, pressure caused by the particles of the sealed fluid is exerted so as to push the first resilient seal ring toward the seal chamber and also is acted on the first press urging surface of the first seal ring so as to urge the first seal surface against the second seal surface. However, the first resilient seal ring on which pressure of the sealed fluid is acted has a displacement for moving away to the opposite direction with respect to the first seal surface on the first seal ring, and thus the pressure does not act as an urging force to the first seal surface. Although the pressure of the sealed fluid is acted on the first press urging surface, at the same time, the fact that the dimensional ratio H/L of the first press urging surface is chosen as no more than 0.5 permits the pressure receiving area of the first press urging surface to become small. Therefore, a force acting on the first seal surface does not become too large even if the pressure of the sealed fluid is acted on the first press urging surface with a down-sized pressure receiving area, and thereby a temperature increase by the frictional heat generated at the first seal surface can be avoided.

As a result, the first seal surface can effectively avoid a crack formation as well as wear in accordance with temperature increase thereof by sliding. Moreover, even if the friction heat generation caused by sliding is enhanced at the first seal surface, the seal device of the present invention effectively prevents the first resilient seal ring from softening due to an increase of heat transfer to the first resilient seal ring as well as deteriorating the resilient urging ability of the first resilient seal ring exerted to the first seal ring. Further, entrance and accumulation of dirt and sand in the cavity which is delivered with a sealed fluid is resulted neither in promoting wear due to abnormal increase of the surface pressure at the seal surface nor in deterioration of seal ability thereof.

Described next is preferred embodiments related to the present invention.

In a seal device as a first embodiment of the present invention, with reference to the radially spanning surface of the first seal surface on the first seal ring, a support surface on the second seal ring is defined in axially symmetric a manner to the first press urging surface on the first seal ring, so is a fixing surface on the second seal retainer to the first inner circumferential fixing surface on the first seal retainer, and so is a seal annular body to the first resilient seal ring and provides a support for the second seal ring.

According to the seal device of the first embodiment relative to the present invention, the second seal ring and the second resilient seal ring are arranged, respectively, in a symmetric manner to the first seal ring and the first resilient seal ring. Therefore a high pressure sealed fluid which comes into the cavity is acted on the first resilient seal ring and the second resilient seal ring. The fluid is also acted on the respective press urging surfaces on the first seal ring and the second seal ring. As described above as the advantages of the present invention, because the press urging surfaces are formed to have a small pressure receiving area, the first seal surface and the second seal surface can avoid an increase in the urging force exerted to each other regardless of the pressure of sealed fluid. As the result, not only wear of the respective seal surfaces due to slide friction is avoided, but also softening of the first resilient seal ring and the second resilient seal ring because of the sliding generated heat and a resulting decrease in seal ability and urging ability are avoided. Thus, the first resilient seal ring and the second resilient seal ring are able to urge the first and the second seal rings, respectively, in an even manner for an outstanding seal performance.

In a seal device as a second embodiment of the present invention, the first press urging surface or/and the second press urging surface is disposed in a circular arc form on both end portions of the annular surface and the circular arc surface has a curvature which is more or less the same as that of the outer periphery of the resilient seal ring.

According to the seal device of the second embodiment relative to the present invention, because the second press urging surface of the second seal ring as well as the first press urging surface of the first seal ring are in a circular arc form at their both end portions, the respective circular arc surfaces are able to come into a mating contact with the outer circumferential surfaces on the corresponding resilient seal rings. This leads to preventing the sealed fluid from coming into between the respective press urging surfaces and the outer circumferential surfaces on the corresponding resilient seal rings and also preventing the fluid pressure from acting on the press urging surfaces. As a consequence, an urging pressure to the respective seal rings can be determined according to a prescribed pressure provided by the resilient force of the respective resilient seal rings alone. Therefore durability of the seal device is enhanced.

Moreover, in a seal device as a third embodiment of the present invention, a first resilient seal ring or/and a second resilient seal ring or a seal annular body is made of hydrogenated nitrile butadiene rubber material.

According to the seal device of the third embodiment relative to the present invention, as the first resilient seal ring and the second resilient seal ring or the seal annular body are made of hydrogenated nitrile butadiene rubber (H-NBR) material which provides them with durability against the increasing temperature of the seal rings, the first resilient seal ring and the second resilient seal ring or the seal annular body are capable of not only performing outstanding seal ability without getting softened by the high temperature from heat generation, but also maintaining resilient urging force for urging the seal rings. That is, even when the respective seal surfaces are heated from sliding as the result of the respective seal rings being urged by high pressure of the sealed fluid in which the press urging surfaces are limited to no more than H/L=0.5, the first resilient seal ring and the second resilient seal ring can put up with the mildly increased temperature so that resiliently urging forces and seal ability are well performed.

BRIEF DESCRIPTION OF THE DRAWINGS

FIG. 1 shows a half cross sectional view of the seal device as a first embodiment relative to the present invention.

FIG. 2 shows a half cross sectional view of the first seal ring shown in FIG. 1.

FIG. 3 shows a partial half cross sectional view of the first resilient seal ring of the seal device relative to the present invention in which a sealed fluid is acted on the first resilient seal ring.

FIG. 4 shows a portion of half cross sectional view of the seal device relative to the present invention given in FIG. 1 which is mounted to a reduction gear apparatus.

FIG. 5 shows a half cross sectional view of the seal device as a second embodiment relative to the present invention.

FIG.6 shows a half cross sectional view of the seal device of the first embodiment relative to the present invention under a sliding test.

FIG. 7 shows a chart of the temperature of heat generation in the sliding test of the seal device relative to the present invention as example 1 and other related temperatures.

FIG. 8 shows an enlarged sketch of a microscope observation of a cross section of the seal surface side after the sliding test of the seal surface of the seal device relative to FIG. 7.

FIG. 9 shows a chart of the temperature of heat generation in the sliding test of the seal device relative to the present invention as example 2 and other related temperatures.

FIG. 10 shows an enlarged sketch of a microscope observation of a cross section of the seal surface side after the sliding test of the seal surface of the seal device relative to FIG. 9.

FIG. 11 shows a chart of the temperature of heat generation in the sliding test of the seal device relative to the present invention as reference example 1 and other related temperatures.

FIG. 12 shows an enlarged sketch of a microscope observation of a cross section of the seal surface side after the sliding test of the seal surface of the seal device relative to FIG. 11.

FIG. 13 shows a half cross sectional view of a seal device as a first prior art related to the present invention.

FIG. 14 shows a half cross sectional view of a seal device as a second prior art related to the present invention.

BEST MODE FOR CARRYING OUT THE INVENTION

Described below is the details of the figures of a preferred embodiment in accordance with the principles of the present invention. All the figures explained below are constructed according to actual design drawings with accurate dimensional relations.

Figure 1:
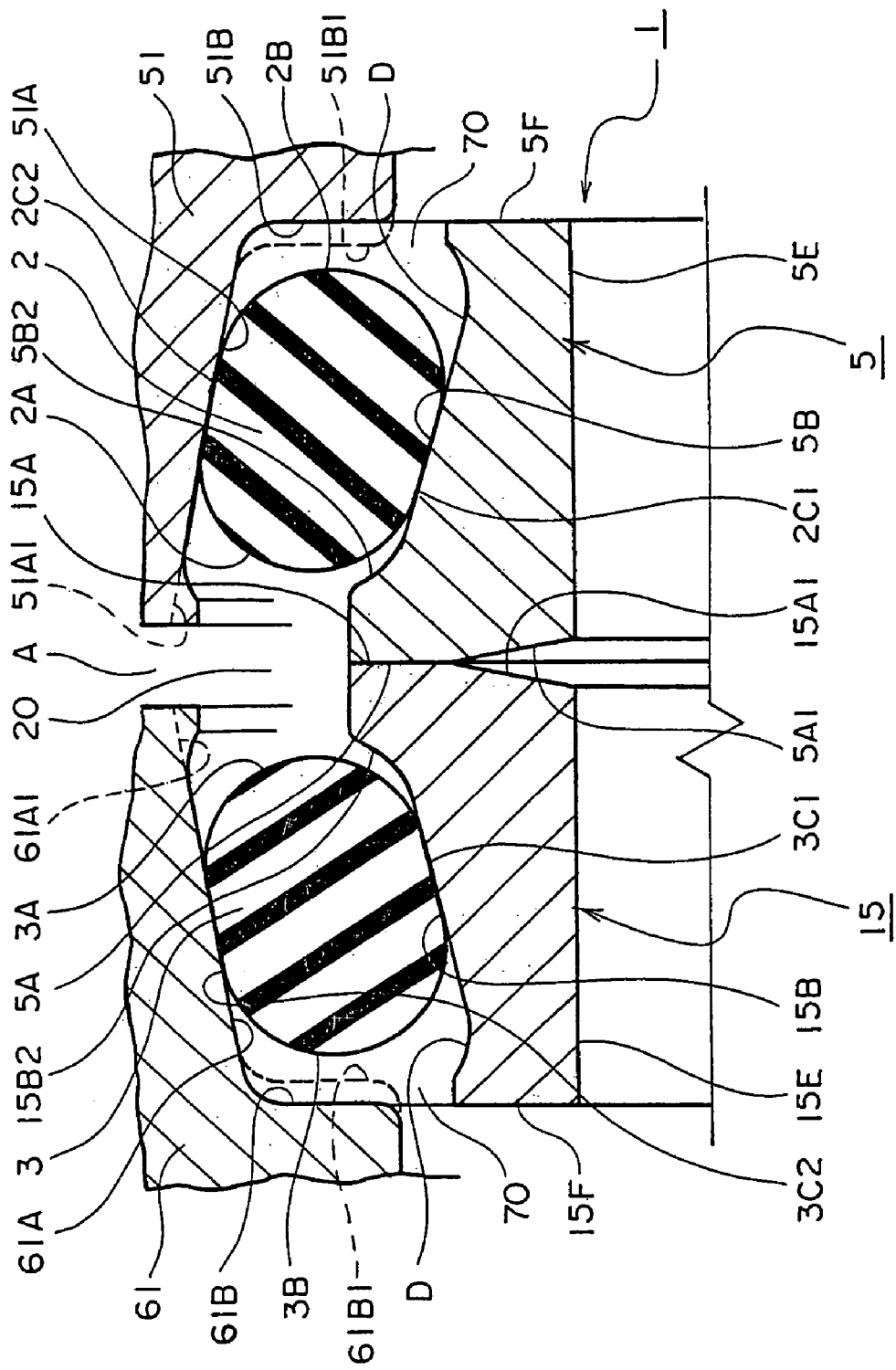
[FIG. 1]
Figure 2:
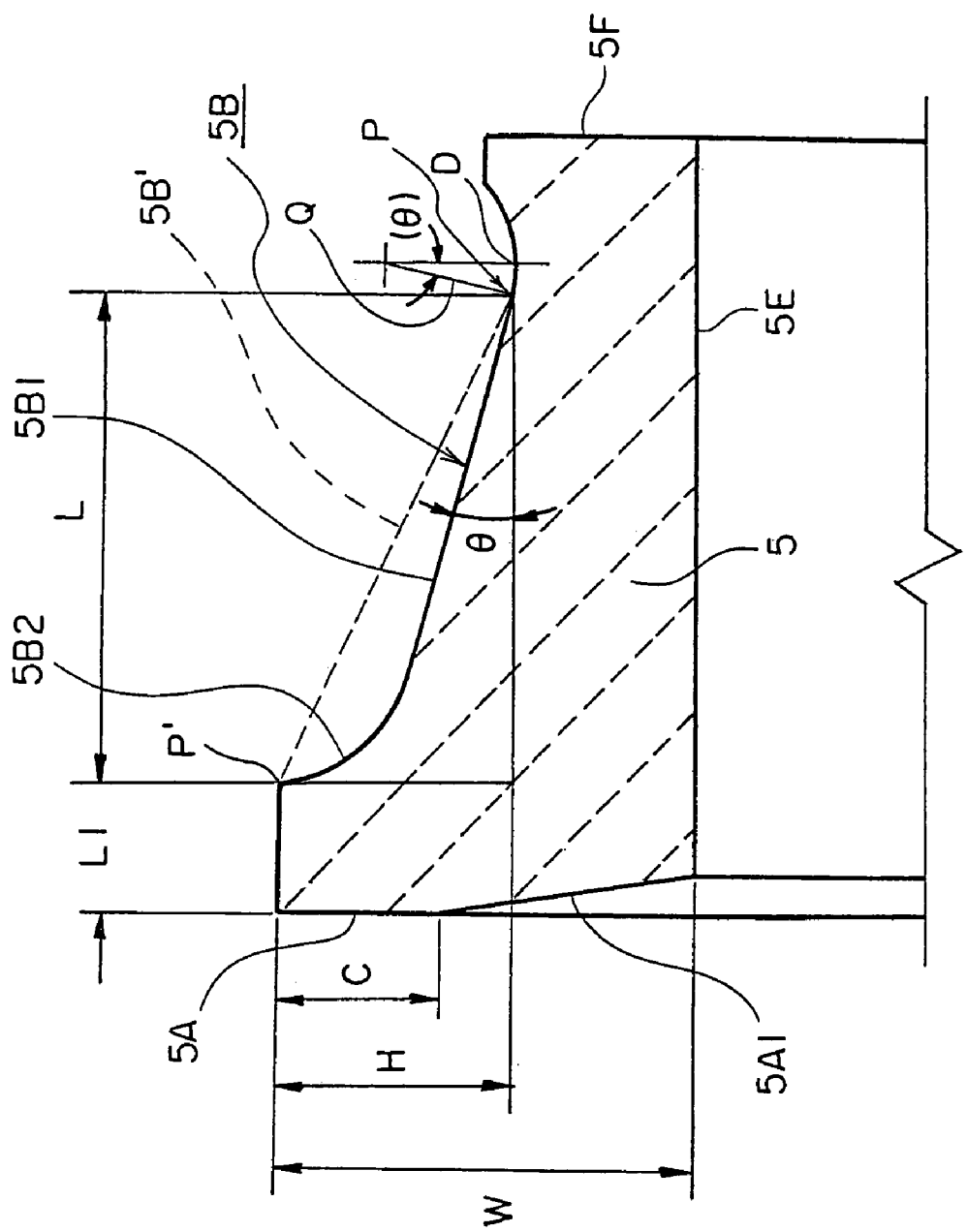
[FIG. 2]
Figure 4:
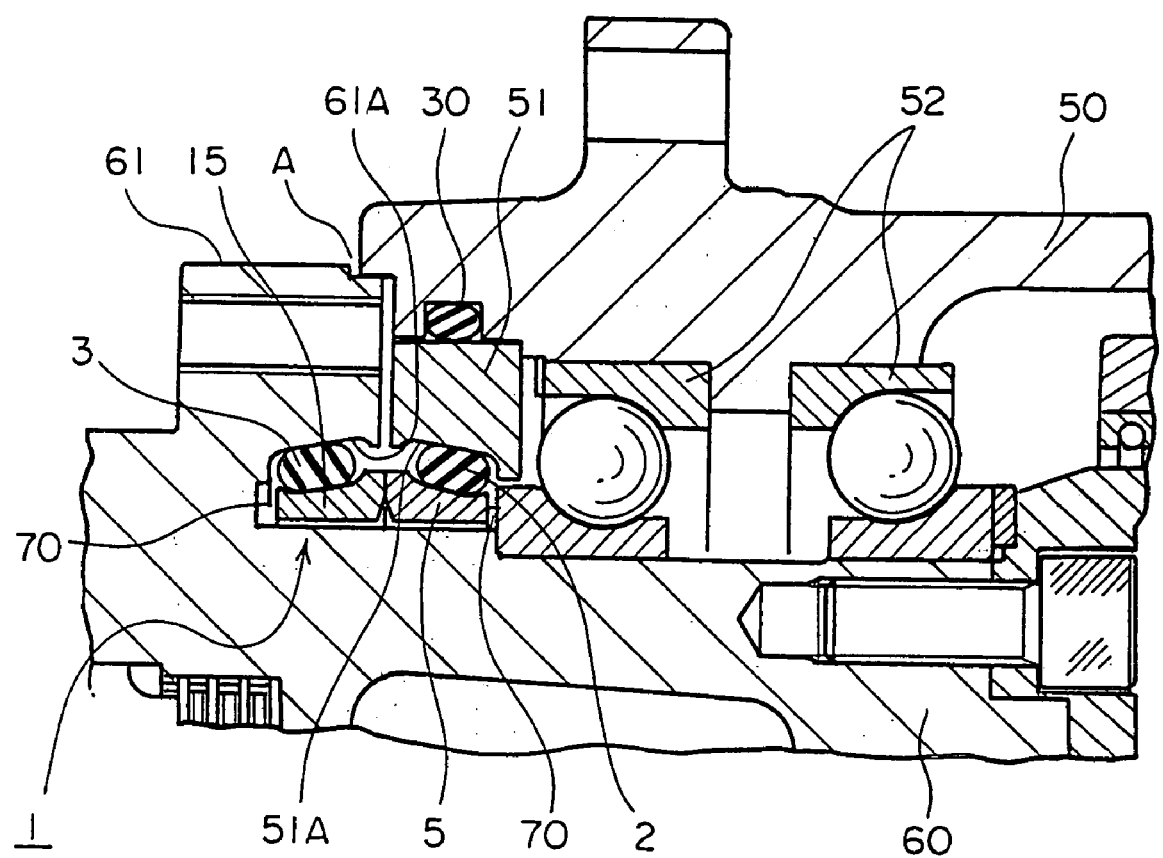
[FIG. 4]

FIG. 1 shows a half cross sectional view of the seal device as a first embodiment relative to the present invention. FIG. 2 shows a half cross sectional view of the first seal ring shown in FIG. 1. FIG. 4 shows a cross sectional view of the substantial portion of a reduction gear apparatus mounting the seal device 1.

The first embodiment is described below by referring to FIG. 1, FIG. 2 and FIG. 4. A seal device 1 is disposed within a seal chamber 70 which is formed between a roller 50 and a retainer 60 which is fitted to a shaft. The seal chamber 70 is defined as an interior space surrounded by a first inner circumferential fixing surface 51A on a first seal retainer 51 which is mounted via O-ring 30 to the end portion side of the roller 50, a retainer 60, and a second inner circumferential fixing surface 61A on a second seal retainer 61 wherein the second seal retainer 61 is integral to the retainer 60 (note that the second seal retainer 61 may be provided as a separate member from the retainer 60). The retainer 60 relatively rotates with respect to the roller 50 via bearings 52. Also the seal chamber 70 directly communicates with outside A when the seal device 1 is absent.

In the reduction gear apparatus thus arranged, there are disposed within the seal chamber 70 a pair of first seal ring 5 and second seal ring 15 in a symmetric manner to each other. As shown in FIG. 1, there is defined a first seal surface 5A on the end surface of the first seal ring 5. The opposite side to the first seal surface 5A forms a first back surface 5F. Likewise, there is defined a second seal surface 15A on the end surface of the second seal ring 15. Also the opposite side to the second seal surface 15A forms a second back surface 15F. The whole shape of the first seal ring 5 and the second seal ring 15 is symmetrically formed in such a manner that the first seal surface 5A and the second seal surface 15A oppositely face to each other.

More details on the first seal ring 5 and the second seal ring 15 are given below. A first press urging surface 5B which is defined on the outer circumference of the first seal ring 5 forms a diameter surface, and the first press urging surface 5B is arranged to form a first tapered surface 5B1 in such a manner that diameter thereof increases as approaching the first seal surface 5A (see FIG. 2). This first press urging surface 5B forms a circular arc surface in more or less the same shape at the both ends of the first tapered surface 5B1. Of these two circular arc surfaces, a first circular arc surface 5B2 which is located to the first seal surface 5A side is formed to possess a curvature radius with which the first circular arc surface 5B2 comes into almost full contact with the outer circumferential surface on the first resilient seal ring 2 which is described later. Moreover, the first back surface 5F side of the first press urging surface 5B is formed a regular circular surface. The inner circumference of the first seal ring 5 defines a first inner circumferential surface 5E which is in a loose fit with respect to the shaft. This first press urging surface 5B can be formed a tapered surface as an alternative embodiment as shown by a broken line as a first press urging surface 5B' in FIG. 2. This first press urging surface 5B can be defined in a variety of forms by referring to FIG. 2 unless the dimensional ratio H/L of width H and length L goes beyond 0.5.

See FIG. 2. In FIG. 2, the first seal ring 5 is formed the first press urging surface 5B as indicated by the solid line. This first press urging surface 5B defines a first tapered surface 5B1 starting from the point P which is an intersecting point of the first press urging surface 5B and a line of curvature radius Q of the regular circumference at an angle θ from the center line passing through D. In this situation, the first taper surface 5B1 is set to make an angle θ with respect to the axial center. The axial length L of the first press urging surface 5B is defined as a distance from P to the end tip point P' which is located at a radially outmost tip of the first circular arc surface 5B2. Also a radial width H of the first press urging surface 5B is defined as a distance of P to the outer diameter surface on the first seal ring 5. Radial surface width of the first seal surface 5A is referred to as C which is smaller than the radial width H of the first press urging surface 5B. Also a thickness of the end portion which forms the first seal surface 5A is referred to as L1. This L1 is determined according to the material strength of the first seal ring 5 and heat transfer of the sliding generated heat from the first seal surface 5A to the first resilient seal ring 2.

As an alternative example for the first press urging surface 5B, there may be formed a first press urging surface 5B' of more or less straight design as indicated by the above broken line. In this arrangement, the dimensional ratio H/L of width H and length L, as described above, should be no more than 0.5. Further, after considerations on a dimensional relationship between radial surface width C of the first seal surface 5A and radial width H of the first press urging surface 5B, the inner diameter side of the end surface at which the first seal surface 5A is disposed is formed a tapered surface 5A1 so as not to make a contact with the opposed end surface. The first seal ring 5 is of annular body design with its thickness W in the radial direction. The radial thickness W is determined from a viewpoint of strength as to whether or not the respective seal surfaces 5A, 15A of the first seal ring 5 and the second seal ring 15 can keep flatness to each other as a floating seal. The diameter of this first seal ring 5 should preferably be in the range of from 38 mm to 1000 mm.

As can clearly be seen in FIG. 1, the second seal ring 15 has a symmetric form to the first seal ring 5. The detailed explanation on the form is omitted because it has the same form as the above mentioned first seal ring 5. There are disposed a second seal surface 15A at the end surface of the second seal ring 15 and also a second back surface 15F at opposite end surface thereof. Also the outer circumference of the second seal ring defines a second press urging surface 15B. This second press urging surface 15B is constituted by a second tapered surface (same form as the first tapered surface 5B1) and a second circular arc surface 15B2 (see FIG. 1). There is formed an inner diameter surface 15E on the inner circumference of the second seal ring 15. Also the inner diameter side of the second seal surface 15A is formed a second tapered surface 15A1. The tapered surface 15A1 can be substituted by a surface of a step shoulder design.

This first seal ring 5 and the second seal ring 15 are made of cast iron which should preferably be Cr—Mo cast iron or Ni—Cr cat iron. As an alternative material to cast iron, cupper alloy, carbon steel, SiC, super-hard alloy, alumina-ceramic, or the like can be used for fabrication. Use of cast iron for the first seal ring 5 and the second seal ring 15 provides merits of good thermal conductivity and low slide friction. Also the fabrication cost as well as material cost is low. Alternatively, only one of the first seal ring 5 and the second seal ring 15 can be made of cast iron. The respective first seal ring 5 and the second seal ring 15 are manufactured from these materials by tool machining or powder forming.

A first seal retainer 51 is fitted via O-ring 30 to a roller 50 (see FIG. 4). Inner circumference of the first seal retainer 51 is formed a first inner circumferential fixing surface 51A which is of annular step shoulder design. The first inner circumferential fixing surface 51A is formed a tapered surface facing in the direction of the first press urging surface 5B. The end tip surface on the first inner circumferential fixing surface 51A forms a circular arc and projects in the radially inward direction although the first inner circumferential fixing surface 51A may be extended straight to define a tapered first end tip surface 51A1. A support surface 51B which is formed on the inner side of the first inner circumferential fixing surface 51A provides the first resilient seal ring 2 with a support when the pressure of the sealed fluid pushes the first resilient seal ring 2 thereto. This support surface 51B plays a role of decreasing a pressure receiving area on the first tapered surface 5B2 of the first press urging surface 5B when the pressure of the sealed fluid is acted on the first resilient seal ring 2. Thus, the first support surface 51B is preferably projected to the proximity of the first resilient seal ring 2 as a first projecting support surface 51B1 which is indicated by the broken line.

A second seal retainer 61 is an integrated member of the retainer 60 (see FIG. 4). However, it may be defined as a separate member from the necessity of inserting the second seal ring 15. A second inner circumferential fixing surface 61A, second end tip surface 61A1, second support surface 61B and second projecting support surface 61B1 of the second seal retainer 61 are designed symmetrically and approximately in the same form as the first inner circumferential fixing surface 51A, first end tip surface 51A1, first support surface 51B and first projecting support surface 51B1 of the first seal retainer 51. Therefore the first seal retainer 51 and the second seal retainer 51 are preferably made of cast iron, cast steel or special steel.

In the seal device 1, the first resilient seal ring 2 of O-ring type is fittingly deformed to an elliptic shape under a resilient compression between the first press urging surface 5B of the first seal ring 5 and the first inner circumferential fixing surface 51A on the first seal retainer 51. This permits a first contact surface 2C1 formed on the inner circumference on the first resilient seal ring 2 to be kept in a seal-tight contact against the first press urging surface 5B, likewise a second contact surface 2C2 formed on the outer circumference thereof to be kept in a seal-tight contact against the first inner circumferential fixing surface 51A on the first seal retainer 51. The resilient urging force of the first resilient seal ring 2 urges the first press urging surface 5B on the first seal ring 5 in the axial direction and provides the first seal surface 5A with an urging pressure so as to form a seal-tight contact against the second seal surface 15A. The first resilient seal ring 2, at the same time, provides a seal against the sealed fluid in the cavity 20 formed between the first seal ring 5 and the first seal retainer 51, preventing fluid leakage to the seal chamber 70 side.

Next, the second resilient seal ring 3 is disposed in a symmetrical location with respect to the first resilient seal ring 2 and the shape is also symmetrical to that of the first resilient seal ring 2. The second resilient seal ring 3 also is fittingly deformed to an elliptic shape under a resilient compression between the second press urging surface 15B on the second seal ring 15 and the second inner circumferential fixing surface 61A on the second seal retainer 61. This permits a first contact surface 3C1 formed on the inner circumference of the second resilient seal ring 3 to be kept in a seal-tight contact against the second press urging surface 15B, likewise a second contact surface 3C2 formed on the outer circumference thereof to be kept in a seal-tight contact against the second inner circumferential fixing surface 61A on the second seal retainer 61. The resilient urging force of the second resilient seal ring 3 urges the second press urging surface 15B on the second seal ring 6 in the axial direction and provides the second seal surface 15A with an urging pressure so as to form a seal-tight contact against the first seal surface 5A. The second resilient seal ring 3, at the same time, provides a seal against the sealed fluid in the cavity 20 formed between the second seal ring 15 and the second seal retainer 61, preventing fluid leakage to the seal chamber 70 side. The sealed fluid in the cavity 20 is brought from outside A during the operation of dump track, tractor, or the like which mounts the seal device 1 therein.

The first resilient seal ring 2 and the second resilient seal ring 3 are made of a rubber material. The rubber material used, for example, is Hydrogenated Nitrile Butadiene Rubber (H-NBR), Perfluoroelastomer, Nitrile Rubber (NBR) with hardness DuroA 60 to 70, Urethane Rubber (U), Fluoride Rubber (FKM), Butyl Rubber (IIR), resin possessing a resiliency (for instance, Tetrafluoroethylene-Perfluoro Methyl Vinyl Ether Rubber), Silicone, or the like. The first resilient seal ring 2 and the second resilient seal ring 3 are assumed to be O-rings, and the diameter of the O-ring in this embodiment is preferably in the range of from 5 mm to 18 mm.

In the first resilient seal ring 2 and the second resilient seal ring 3 thus arranged, under a normal pressure of the sealed fluid, the first contact surface 2C1 on the first resilient seal ring 2 is brought to a seal-tight contact with the first press urging surface 5B on the first seal ring 5 while the first contact surface 3C1 on the second resilient seal ring 3 is brought to a seal-tight contact with the second press urging surface 15B on the second seal ring 15. In addition, the second contact surface 2C2 on the first resilient seal ring 2 is brought to a seal-tight contact with the first inner circumferential fixing surface 51A on the first seal retainer 51 while the second contact surface 3C2 on the second resilient seal ring 3 is brought to a seal-tight contact with the second inner circumferential fixing surface 61A on the second seal retainer 61. Under this circumstance, the first contact surface 2C1 on the first resilient seal ring 2 and the first contact surface 3C1 on the second resilient seal ring 3, respectively, provide a resilient urging force against the first press urging surface 5B on the first seal ring 5 and the second press urging surface 15B on the second seal ring 15, thereby the first seal surface 5A and the second seal surface 15A are brought to a seal-tight contact to each other.

Figure 3:
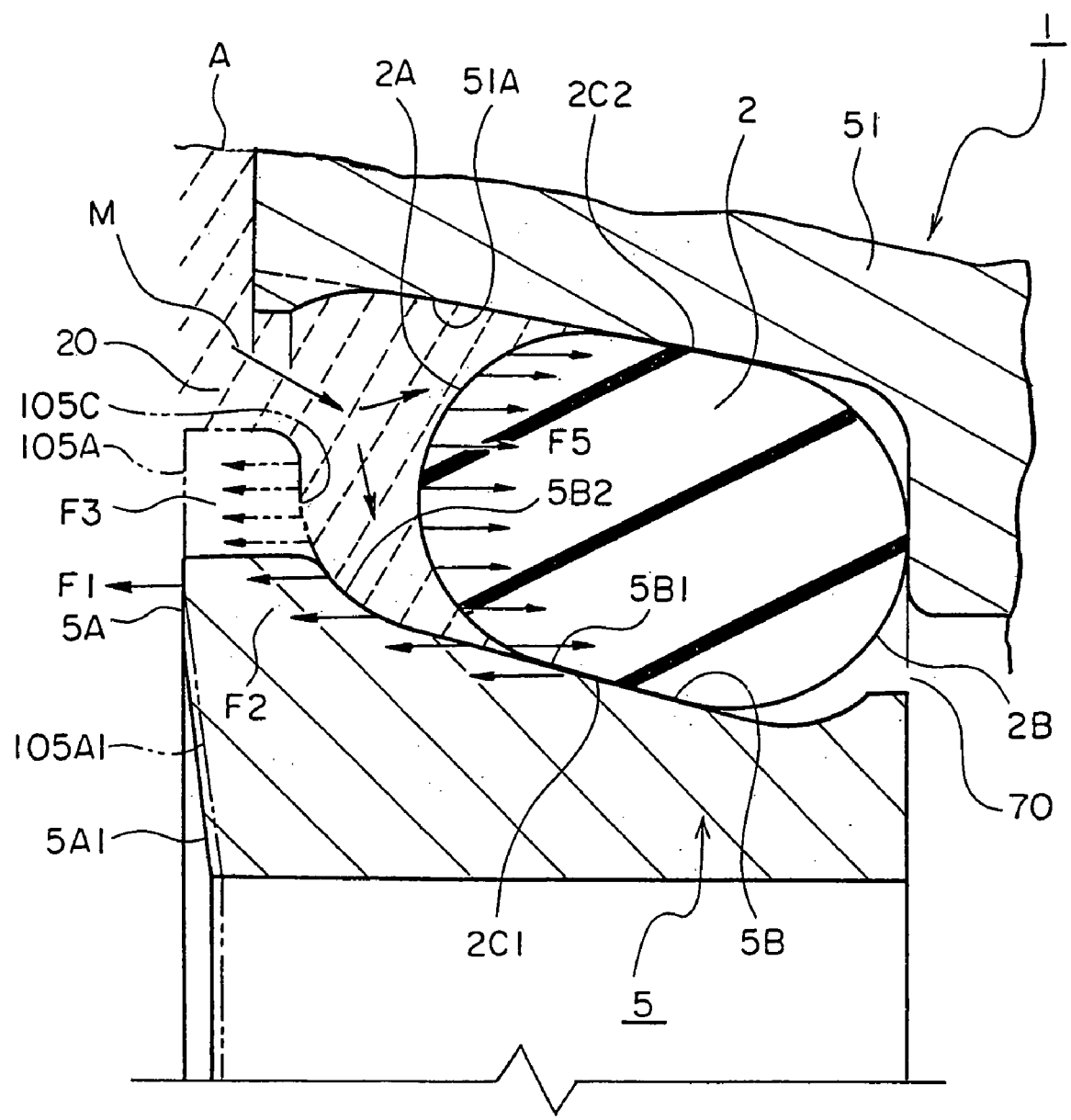
[FIG. 3]
Figure 13:
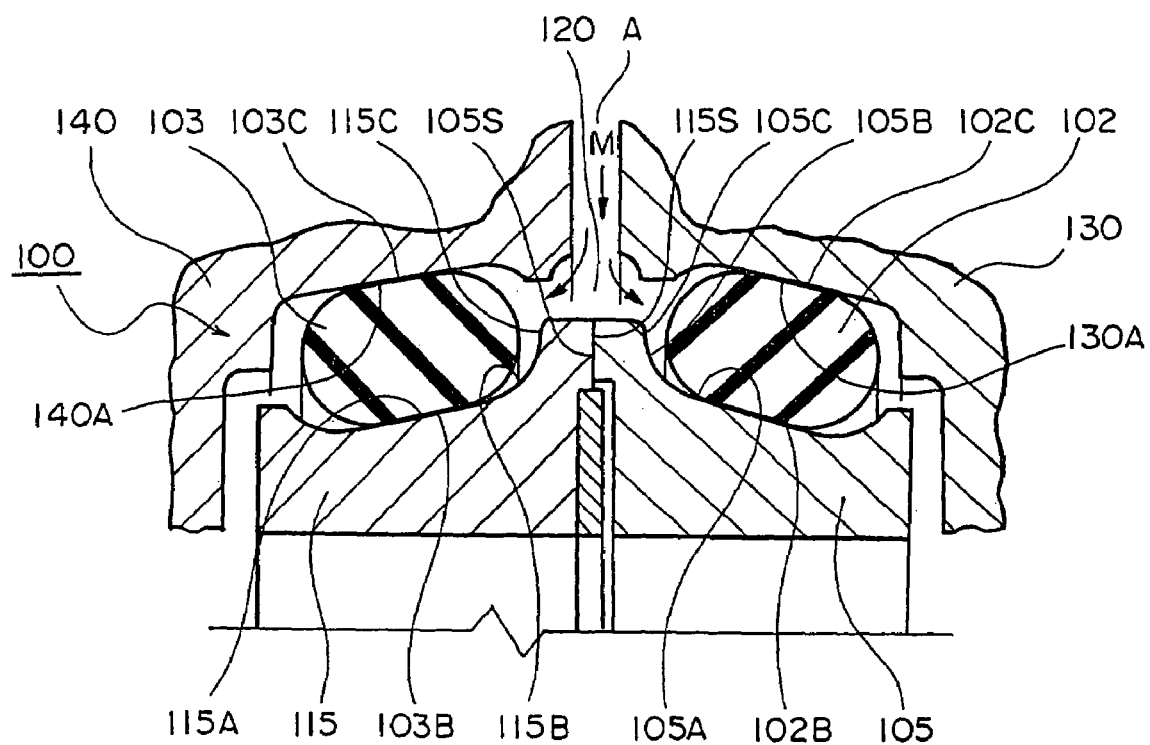
[FIG. 13]
Figure 14:
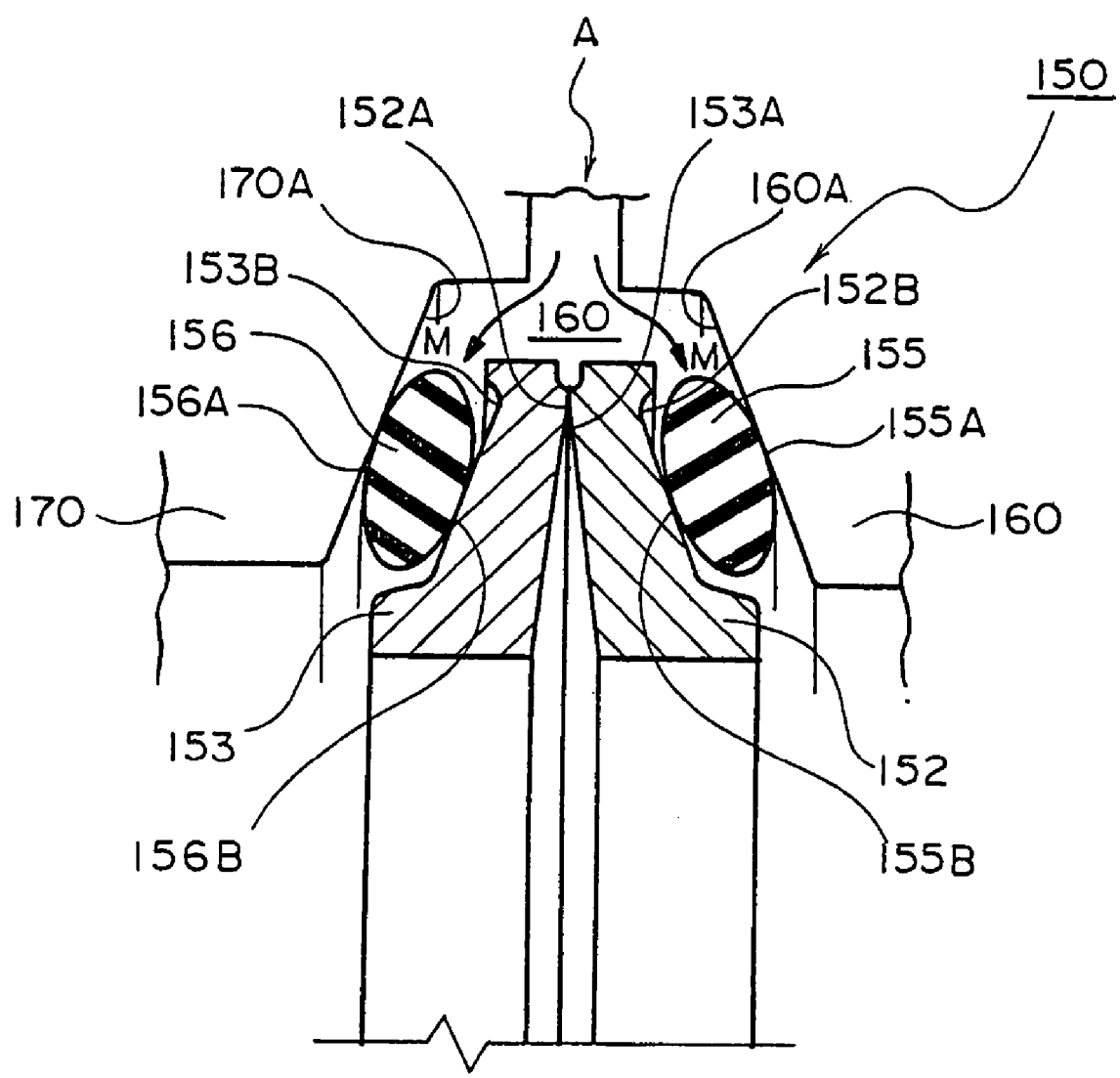
[FIG. 14]

And a sealed fluid M at high pressure acting from outside A on the cavity 20 of the seal device 1 causes a pressure state as shown in FIG. 3. Particles such as dirt, sand and the like contained in the sealed fluid M are deposited within the cavity 20, which increases pressure thereat. In prior art as shown in FIG. 13, a first vertical surface 105C is formed as indicated by a virtual line in FIG. 3, extending radially outward from the first circular arc surface 5B2. The opposite side defines a first seal surface 105A and a tapered surface 105A1. In this situation, the pressure of the sealed fluid M is acted on the first seal ring 5 as a resultant force which combines F2 and F3 in which F2 is a force acted on the first circular arc surface 5B2 and F3 is a force acted on the first vertical surface 105C. The force F3 acted on the first vertical surface 105C provides a great urging pressure to the first seal surface 105A, and a friction heat generated by sliding of the first seal surface 105A causes not only a temperature increase of the first seal surface 105A but also wear of the first seal surface 105A. At the same time, the sealed fluid M gives urging force F5 to the first resilient seal ring 2 and the second resilient seal ring 3 as shown in FIG. 3. Similar argument is applied to the second seal ring 15 and the second resilient seal ring 3.

In the present invention, however, the dimensional ratio H/L between width H and length L, which determines the respective pressure receiving areas of the first press urging surface 5B and the second press urging surface 15B, is no more than 0.5. Therefore, a first pressure receiving area on the first press urging surface 5B and a second pressure receiving area on the second press urging surface 15B can be kept small, thereby a combined resultant force F2 acted on the first pressure receiving area as well as another combined resultant force F2 acted on the second pressure receiving area become small (a figure for the second seal ring 15 is omitted due to its symmetrical form). As a consequence, forces acting on the respective seal surfaces 5A, 15A can be reduced. This leads to prevention of wear and heat generation due to sliding of the first seal surface 5A and the second seal surface 15A which are in s seal-tight contact against each other. Moreover, it not only prevents a permanent deformation and stress relaxation of the first resilient seal ring 2 and the second resilient seal ring 3 due to high temperature caused by the heat generation, but also enhances a resiliently urging capability of the first resilient seal ring 2 against the first seal ring 5 and of the second resilient seal ring 3 against the second seal ring 15.

Figure 5:
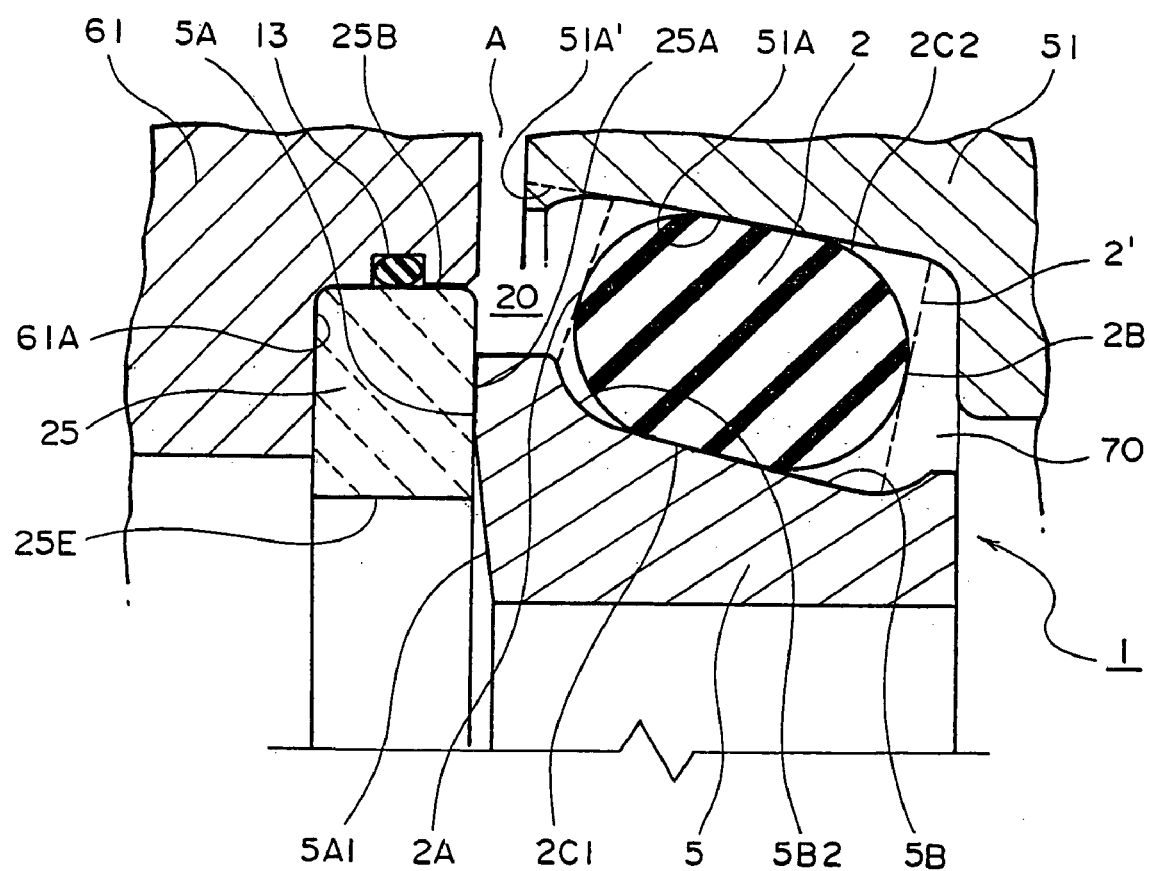
[FIG. 5]

FIG. 5 is a cross sectional view of a half portion of a seal device 1 related to another embodiment of the present invention. The first seal ring 5, the first resilient seal ring 2, and the first seal retainer 51 which appear in the right portion of FIG. 5 are of the same form as those described above. In the left portion of FIG. 5, there is a fixing surface 61A of a step shoulder design formed on the second seal retainer 61. This fixing surface 61A fittingly receives a second seal ring 25 in a seal-tight manner via O-ring as a seal annular body 13. The seal annular body 13 provides a seal between the second seal retainer 61 and the second seal ring 25. A second seal surface 25A is formed on the end portion of the second seal ring 25. Also a second inner diameter surface 25E is formed on the inner circumference of the second seal ring 25 with a clearance relative to the shaft. As can be seen in this example, only the first seal ring 5 of the seal device 1 is prepared according to the present invention while the second seal ring 25 is formed in an alternative way. The seal annular body 13, as shown in FIG. 5, may be disposed between the second seal retainer 61 and the second seal ring 25 so as to provide a seal between the contact surfaces on the second seal retainer 61 and the second seal ring 25. Another example, as shown in FIG. 1, provides not only a seal between the contact surfaces but also a resilient support and an urging force for the second seal ring 25. Therefore, the seal annular body 13 may have a different form according to a combination in the forms of the second seal retainer 61 and the second seal ring 25.

As illustrated in the above embodiments, the seal device 1 can provide a seal against a sealed fluid or dirt water or the like which gradually is deposited and increases pressure after entering from outside A as the roller 50 rotates. Within the seal chamber 70, bearings 52 are disposed between the roller 50 and the shaft, and so the chamber is filled with lubrication oil. However, the first resilient seal ring 2 and second resilient seal ring 3 are able to provide a seal against the lubrication oil regardless of a pressure exerted therefrom because of the high pressure that the seal fluid exerts (see FIG. 4). And even if the sealed fluid is at high pressure, the respective seal surfaces 5A, 15A are not pressed too much against each other owing to the choice of dimensional ratio H/L at no more than 0.5 in which H and L are a radial width and axial length, respectively, of the tapered surfaces as the first press urging surface 5B on the first seal ring 5 and the second press urging surface 15B on the second seal ring 15. And the first seal surface 5A and the second seal surface 15A are free of wear and prevent a heat generation during sliding, thereby providing an outstanding durability of the first resilient seal ring 2 and second resilient seal ring 3 and enhancing the seal ability. Explanation of other reference numerals is the same as in FIG. 1.

Figure 6:
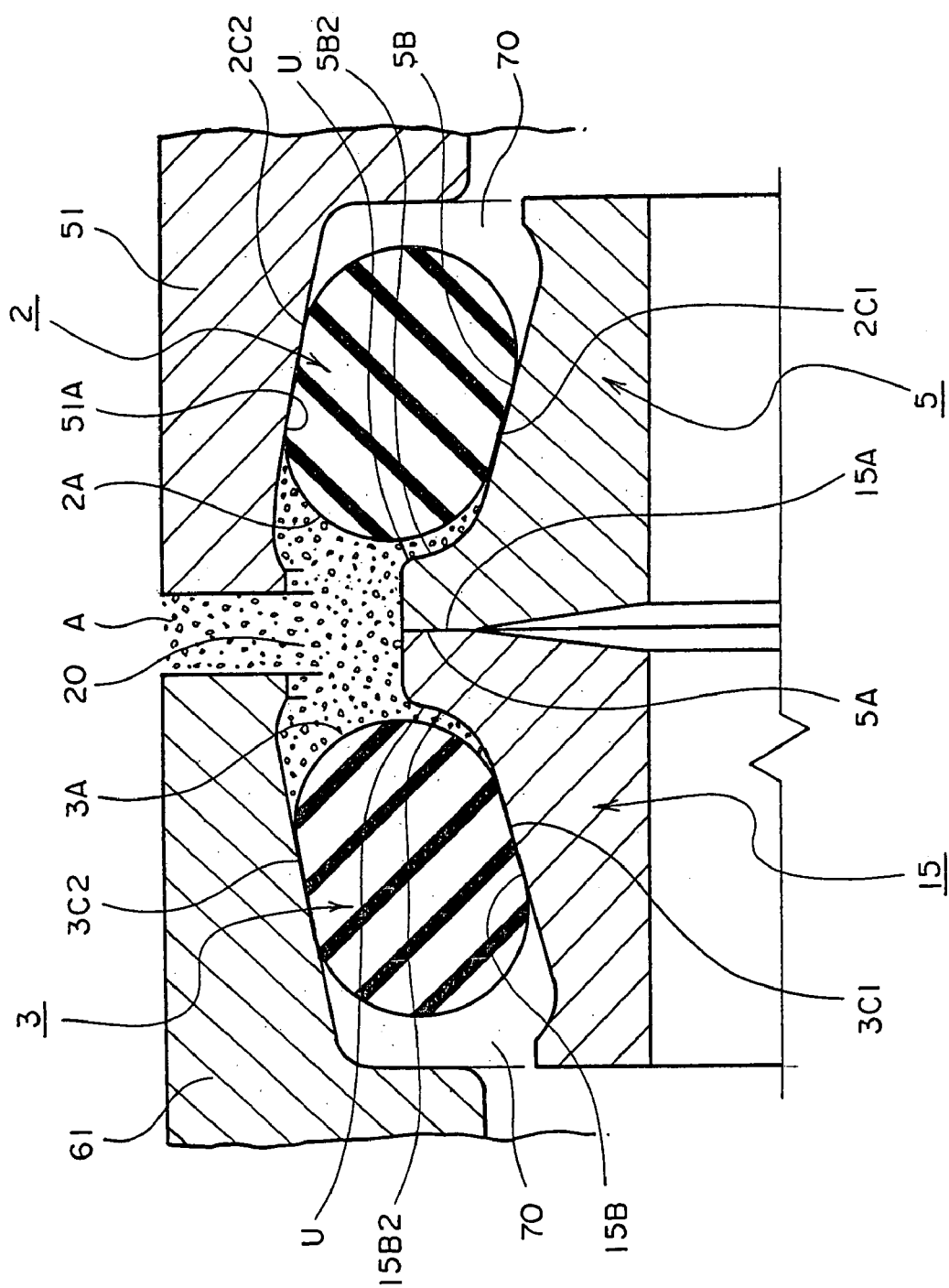
[FIG. 6]

A seal device 1 of FIG. 6 has approximately the same construction as the seal device 1 shown in FIG. 1. A first seal ring 5 and second seal ring 15 have an axial length L of 21 mm and a maximum outer diameter of 260 mm. Then a first resilient seal ring 2 and second resilient seal ring 3 are O-rings whose outer diameter is 274.6 mm and wire diameter is 13.1 mm. Moreover, a width of the inlet passage which permits the sealed fluid from outside A into a cavity 20 is set to 4 mm.

With this seal device 1, the respective first seal surface 5A and second seal surface 15A of the present invention were subjected to the testing of wear and temperature increase under sliding conditions. As for the construction of the seal device 1 in FIG. 6, same reference numerals correspond to same members shown in FIG. 1. As shown in FIG. 6, dirt is fed under a high pressure into the cavity 20, and the first resilient seal ring 2 and the second resilient seal ring 3 are brought to a pressurized state as given in FIG. 3. Under this circumstance, the dirt water is forced to enter to between the first resilient seal ring 2 and the first press urging surface 5B as well as between the second resilient seal ring 3 and the second press urging surface 15B.

EXAMPLE 1 OF THE PRESENT INVENTION

Figure 7:
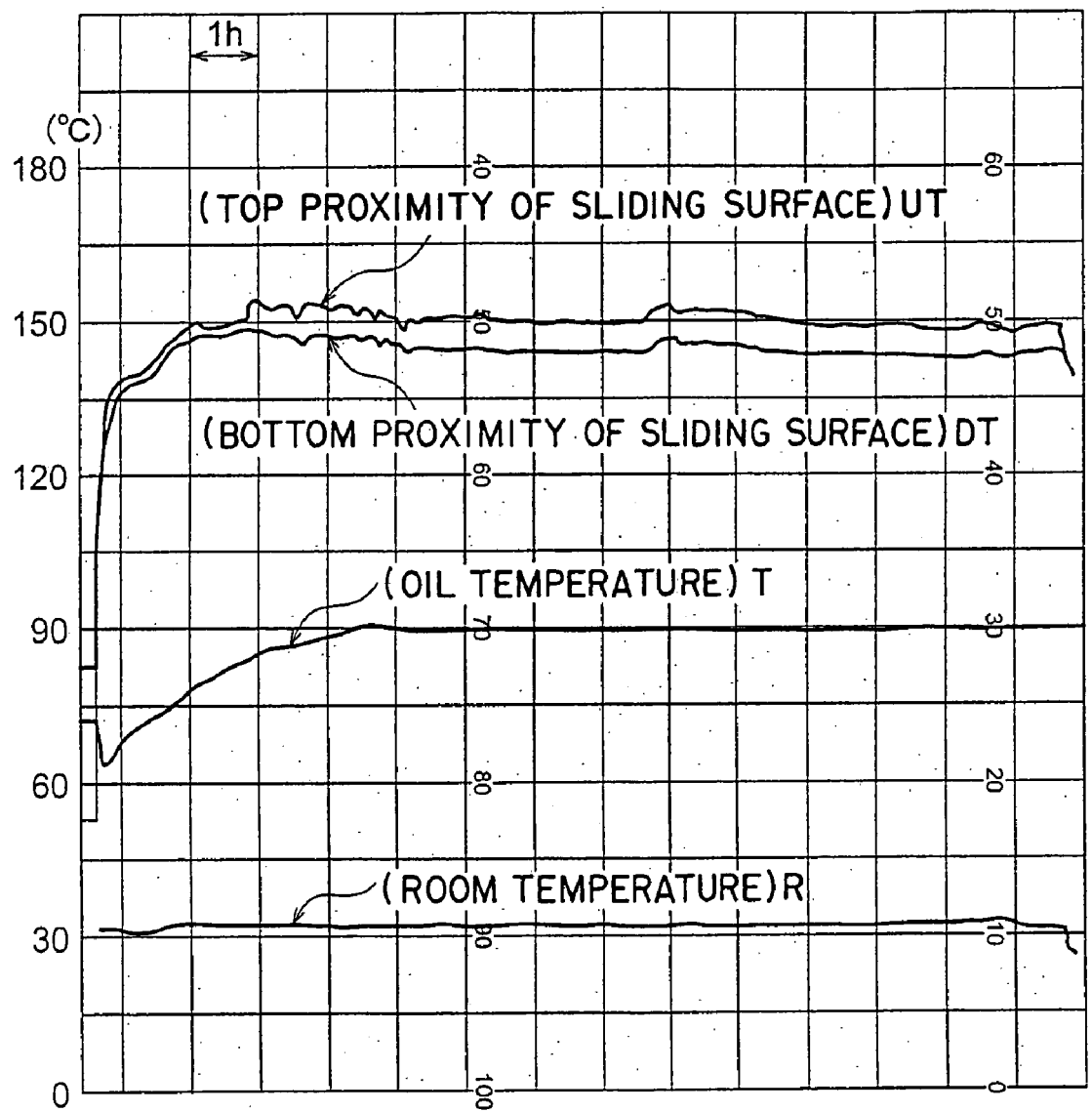
[FIG. 7]

FIG. 7 represents a chart from the first test conducted under the following conditions in which temperatures at the close proximity of the first seal surface 5A and the second seal surface 15A were measured. Testing conditions of the first test are as follows.

1) The first press urging surface 5B on the first seal ring 5 and the second press urging surface 15B on the second seal ring 15 are arranged in such a manner that H/L=0.35 in accordance with the form in FIG. 2.

2) Lubrication oil in the seal chamber 70 is gear oil #90 and is heated up by an oil heater.

3) Periphery speed of the first seal surface 5A is 0.6 m/s.

4) Testing duration is 50 hours in continuous operation.

Then the respective first seal surface 5A and the second seal surface 15A are forced a relative sliding motion to each other in which temperatures of at least two places were measured during sliding, a measurement spot U which is located in the proximity of outer periphery of either first circular arc surface 5B2 or second circular arc surface 15B2 and another symmetrical measurement spot which is located in the proximity of either first circular arc surface 5B2 or second circular arc surface 15B2, not shown, which are on the opposite side along the circumference. The results are shown in the chart of FIG. 7.

In the chart shown in FIG. 7, UT represents temperature measured at the measurement point U which is the upper plot in the figure. DT represents temperature measured at a symmetric point (going around from the point U by 180 degrees along the periphery) relative to the point U about the axis. There exists lubrication oil at the lower portion of FIG. 6. T represents oil temperature in the oil heater. R represents room temperature of where the testing apparatus is placed. Seal rings as a reference example (having a similar form to the seal rings shown in FIG. 13) have a different form from the form given in FIG. 2, but for sake of convenience in use of reference numerals the first seal surface 5A1 and the second seal surface 15A suffered from a burn-out problem after three to five hours of sliding. In the first example, however, there was no burn-out observed for the first seal surface 5A1 and the second seal surface 15A. Also the temperature of the respective first seal surface 2 and the second seal surface 3 was maintained approximately at 150 degrees Celsius. Therefore the first resilient seal ring 2 and the second resilient seal ring 3 exhibit outstanding durability without getting softened.

Figure 8:
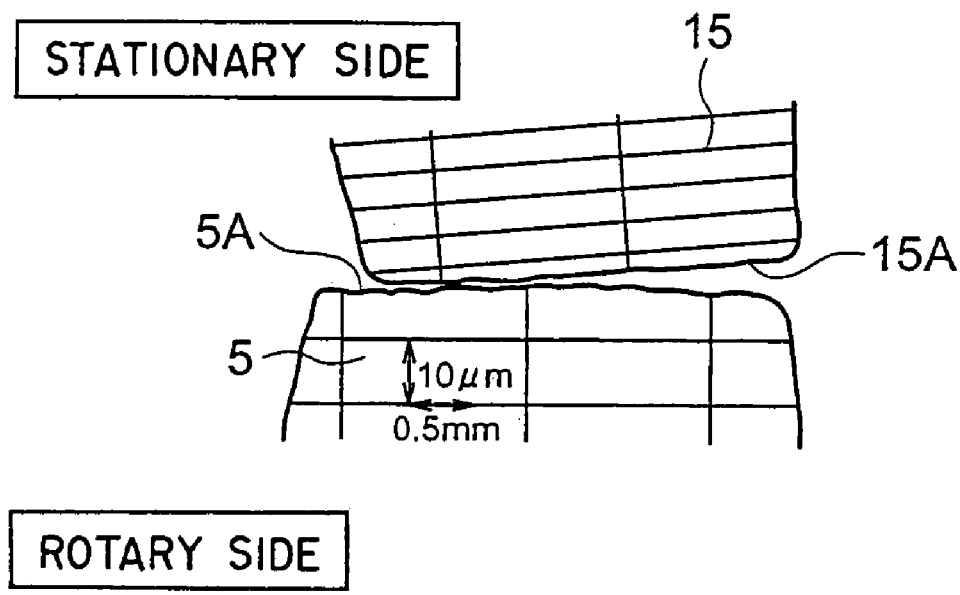
[FIG. 8]

FIG. 8 is an enlarged cross sectional schematic showing wear of the first seal surface 5A and the second seal surface 15A of the first example after the first test. It can be seen that there is almost no progress of wear observed for the first seal surface 5A and second seal surface 15A even after 50 hours of sliding operation.

EXAMPLE 2 OF THE PRESENT INVENTION

Figure 9:
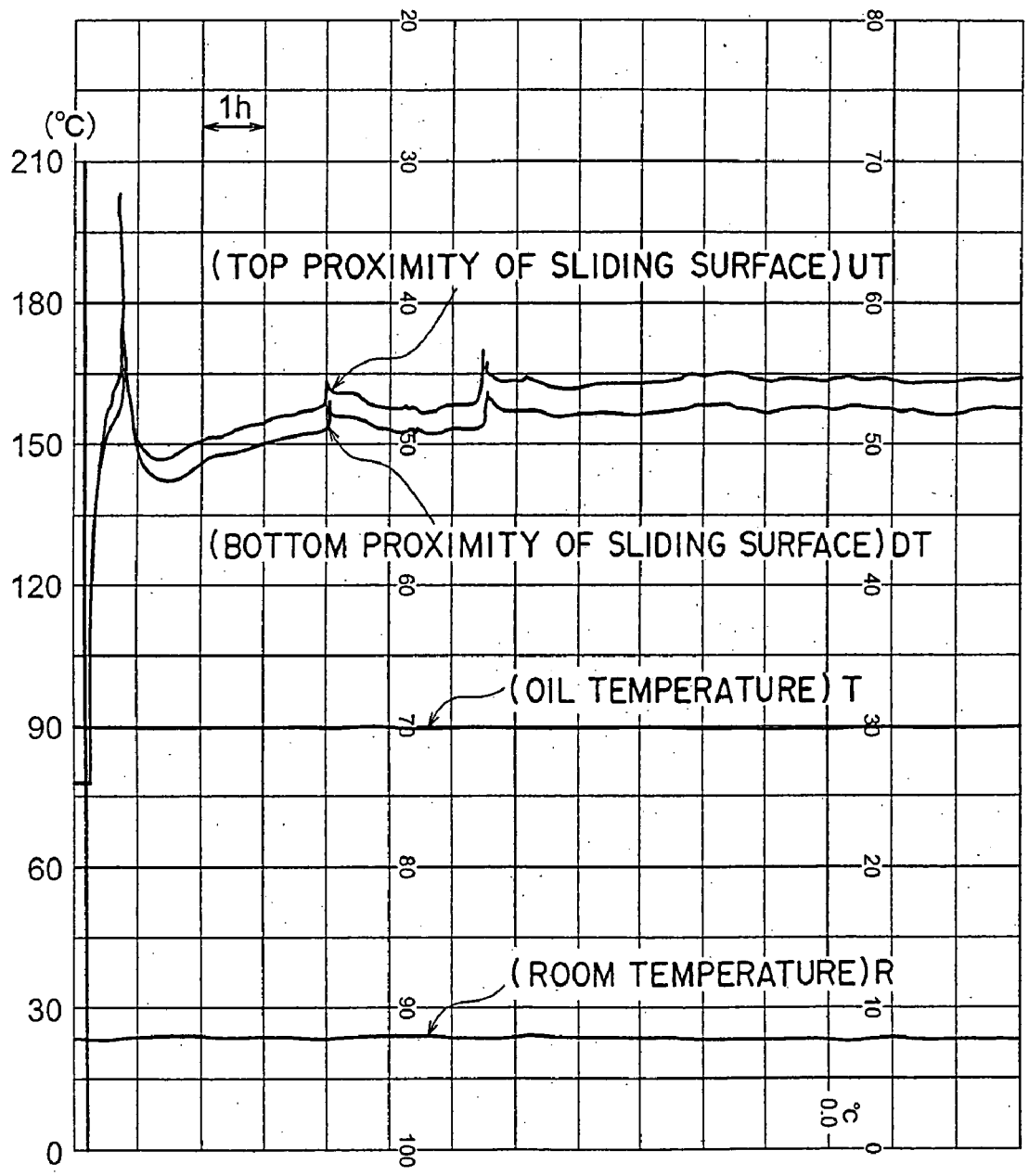
[FIG. 9]

FIG. 9 shows a chart from the first test conducted under the same conditions as the test of the example 1 in which temperatures at the close proximity of the first seal surface 5A and the second seal surface 15A were measured, except that 1) The first press urging surface 5B on the first seal ring 5 and the second press urging surface 15B on the second seal ring 15 are arranged in such a manner that H/L=0.50 in accordance with the form in FIG. 2.

The points used for measurement are the measurement point U shown in FIG. 6 of the first pressure urging surface 5B on the first seal ring 5 and of the second pressure urging surface 15B on the second seal ring 15, and additional measurement points which are located at symmetric locations, 180 degrees opposite on the circumference with respect to the measurement point U.

In the chart shown in FIG. 9, UT represents temperature measured at the measurement point U which is the upper plot shown in FIG. 6. DT represents temperature measured at a symmetric point relative to the point U about the axis. T represents oil temperature in the oil heater. R represents room temperature of where the testing apparatus is placed. The test result was obtained as shown in the chart of FIG. 9. The temperature rise due to heat generation in close proximity of the respective first seal surface 5A and the second seal surface 15A occurred and the temperature kept steady state around 160 degrees Celsius. Even under this temperature the first resilient seal ring 2 and the second resilient seal ring 3 exhibit outstanding durability without getting softened. Respective first seal surface 5A and second seal surface 15A in the prior art started burn-out after three to five hours of sliding test. For the second test, however, no burn-out was observed in the respective first seal surface 5A and second seal surface 15A.

Figure 10:
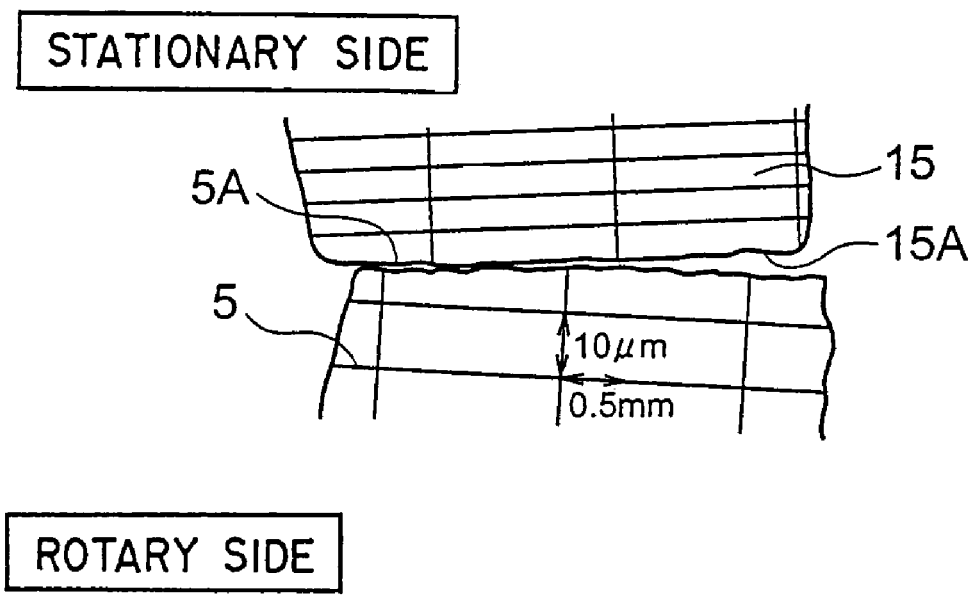
[FIG. 10]

FIG. 10 is an enlarged cross sectional schematic showing wear of the first seal surface 5A and the second seal surface 15A of the second example after the first test. It can be seen that there is little progress of wear observed for the first seal surface 5A and second seal surface 15A even after 50 hours of sliding operation.

REFERENCE EXAMPLE 1

Figure 11:
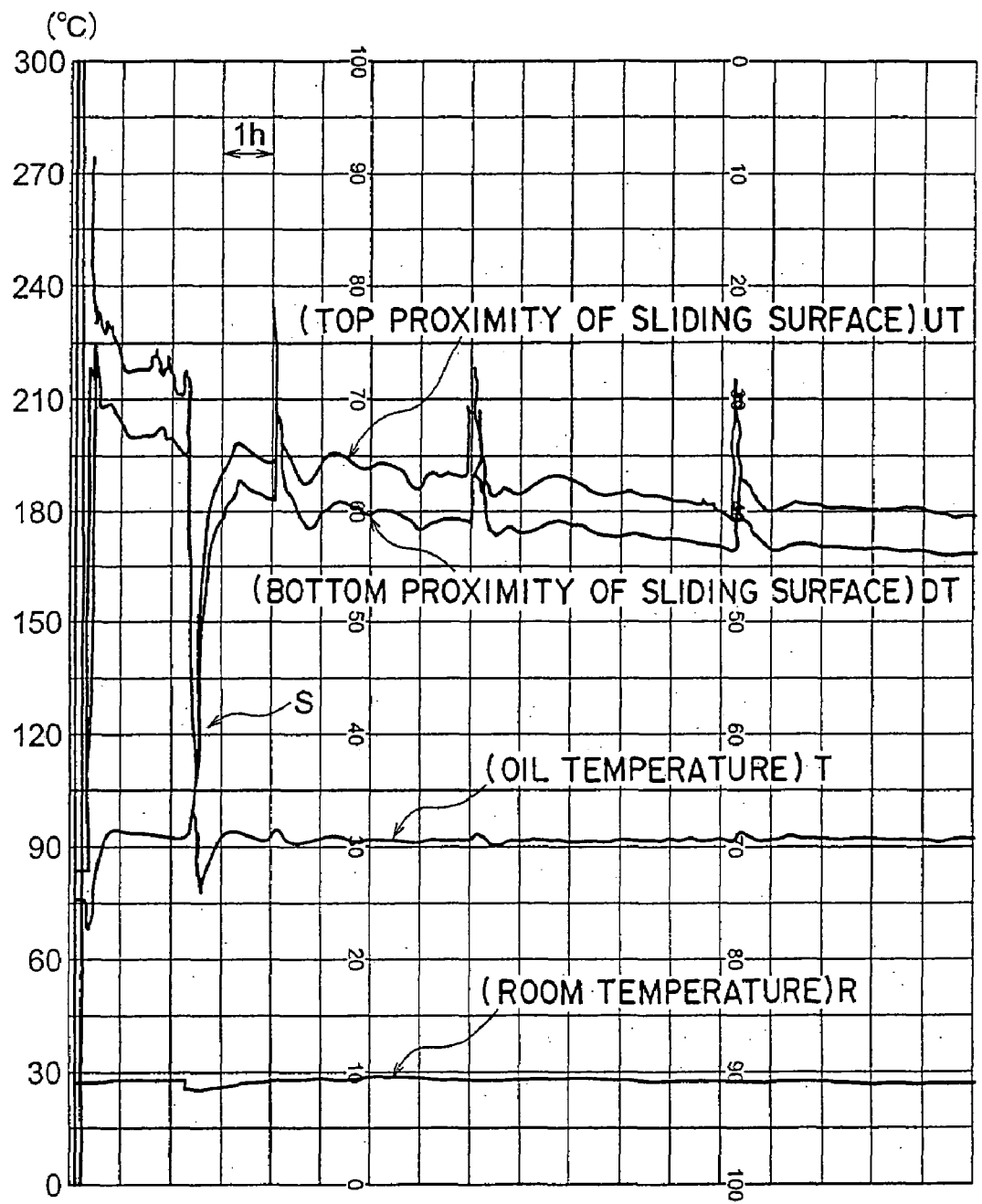
[FIG. 11]

FIG. 11 shows a chart from the second test conducted under the same conditions as the test of the example 1 in which temperatures at the close proximity of the first seal surface 5A and the second seal surface 15A were measured, except that 1) The first press urging surface 5B on the first seal ring 5 and the second press urging surface 15B on the second seal ring 15 are arranged in such a manner that H/L=0.67 in accordance with the form in FIG. 2 (similar form to the seal rings in FIG. 13).

The respective first seal surface 5A and second seal surface 15A are subjected to a relative sliding, and one measurement point U and another measurement point were used for measuring increasing temperatures thereat in which the point U is located at the close proximity of the outer circumference as shown in FIG. 6 and the other measurement point is located at the symmetrically opposite position by 180 degrees along the circumference with respect to the point U. The test result was obtained as shown in the chart of FIG. 11.

In the chart shown in FIG. 11, UT represents temperature measured at the measurement point U which is the upper plot shown in FIG. 6. DT represents temperature measured at a symmetric point (going around from the point U by 180 degrees along the periphery) relative to the point U about the axis. T represents oil temperature in the oil heater. R represents room temperature of where the testing apparatus is placed. According to the test of this reference example 1, the respective first seal surface 5A and second seal surface 15A started to increase temperature thereof immediately after sliding to 230 to 240 degrees Celsius, and the testing apparatus came to a halt after two hours of sliding test because of burn-out on the respective first seal surface 5A and second seal surface 15A. When a further operation was forced, the relatively sliding first seal surface 5A and second seal surface 15A kept sliding while repeating burn-out phenomena for every few hours. It was seen that when the burn-out occurred the temperature of the first seal surface 5A and second seal surface 15A rose to about 220 degrees Celsius. The temperature of the first seal surface 5A and second seal surface 15A under this operation varied in the range of from 170 to 270 degrees Celsius.

Figure 12:
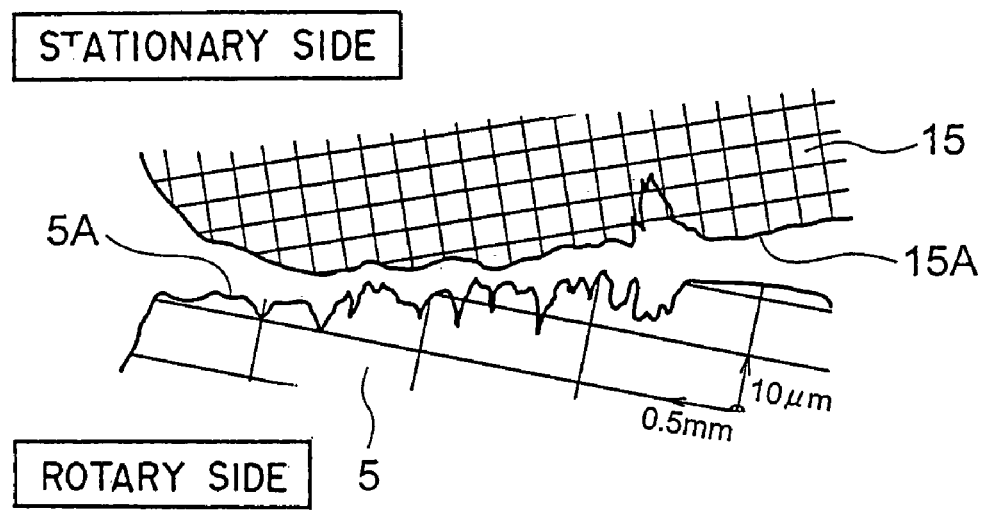
[FIG. 12]

FIG. 12 is an enlarged cross sectional schematic showing wear of the first seal ring 5A and the second seal ring 15A of the reference example 1 after the test. Abnormal wear of the first seal surface 5A and second seal surface 15A is observed compared with the example 1 and example 2. There is also a possibility of softening in the first resilient seal ring 2 and the second resilient seal ring 3 for a long-run use.

While a principle of the present invention has been described above in connection with preferred embodiments of the invention, it is intended that all matter contained in the above description shall be interpreted to be illustrative and not as a limitation to the scope of the invention. It will be understood from these examples that various details of the invention may be changed or modified without departing from the scope of the invention. The scope of the present invention is determined by claims.

INDUSTRIAL APPLICABILITY

As described so far a seal device of the present invention is advantageous in that the seal device exhibits its seal capability by being disposed between a pair of relatively rotating members often seen in the rollers of a crawler, track roller, reduction gear, hydraulic motor or the like. More particularly, the invention is advantageous as a seal device for providing a seal against a highly pressurized sealed fluid or sealed fluid at increased pressure due to impurities deposited between the relative members of the reduction gear unit of automobiles or hydraulic motors of a variety of machinery.

The invention claimed is:

1. A floating seal device for effecting a seal between relatively rotating one component and the other component, said floating seal device comprising:
   (a) a first seal ring having a first seal surface on one end of said first seal ring in an axial direction a first back surface on another end of said first seal ring in the axial direction, a diameter surface, and a first press urging surface being formed on an outer circumference of said diameter surface of said first seal ring;
   (b) a first seal retainer having a first inner circumferential fixing surface, said first inner circumferential fixing surface facing said first press urging surface in an opposing manner;
   (c) a first resilient seal ring disposed between and in seal tight contact with said first press urging surface and said first inner circumferential fixing surface, said first resilient seal ring exerting a resilient urging force against the first press urging surface in the axial direction;
   (d) a second seal ring having a second seal surface on one end of said second seal ring in the axial direction, a second back surface on another end of said second seal ring in the axial direction, a diameter surface wherein said second seal surface is in seal tight contact with said first seal surface on said first seal ring and is slidable relative to said first seal surface, and a second press urging surface formed on an outer circumference of said diameter surface of said second seal ring;

(e) a second seal retainer having a second inner circumferential fixing surface facing said second press urging surface; and (f) a second resilient seal ring disposed between and being in seal tight contact with said second press urging surface and said second inner circumferential fixing surface, said second resilient seal ring exerting a resilient urging force against the second press urging surface in the axial direction;

wherein said first press urging surface comprises a first tapered surface, a first circular arc surface, and a second circular surface, said first tapered surface being configured wherein a diameter thereof increases in a direction approaching the first seal surface, said first circular arc surface and said second circular are surface being formed at both ends of the first tapered surface, said first circular arc surface being located toward the first seal surface side, and said second circular arc surface being located toward said first back surface side, and wherein said first press urging surface is formed to have a dimensional ratio defined by and equation of $H/L \leqq 0.5$ wherein H is a radial width, which extends from a tapered surface starting point P formed at said first back surface side of said first tapered surface to an end tip point P' of said first press urging surface formed at the outer diameter surface of said first seal ring in said first circular arc surface, and L is an axial length, which extends from said tapered surface starting point P of said first tapered surface to said end tip point P' of said first press urging surface.

2. A seal device as claimed in claim 1, wherein said second press urging surface of said second seal ring is symmetrical relative to said first press urging surface of said first seal ring, and said second inner circumferential fixing surface of said second seal retainer is symmetrical relative to said first inner circumferential fixing surface of said first seal retainer, and said second resilient seal ring is symmetrical relative to said first resilient seal ring.

3. A seal device as claimed in claim 1 or claim 2, wherein said circular arc surface of said first press urging surface or/and said second press urging surface has a curvature which is substantially similar to a curvature of the outer circumferential surface of said resilient seal ring.

4. A seal device as claimed in claim 1 or claim 2 or claim 3, wherein said first resilient seal ring or/and said second resilient seal ring is made of hydrogenated nitrile butadiene rubber material.

* * * * *